Oct. 29, 1957  R. L. ELKINS  2,811,209
WELL CLEAN-OUT METHOD
Filed April 12, 1956
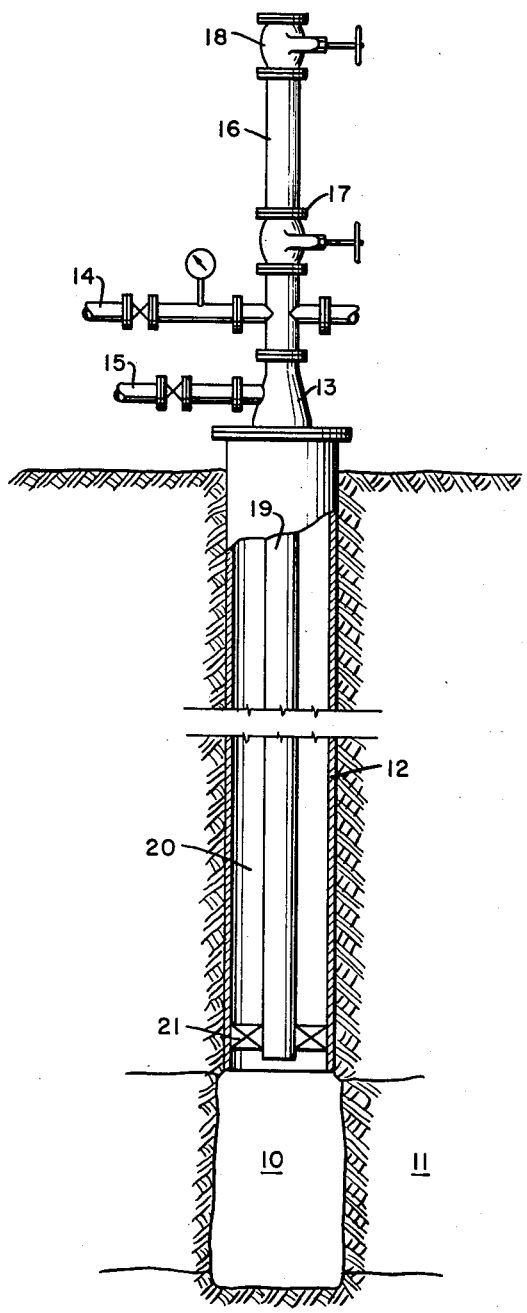
INVENTOR:
R. L. ELKINS
BY: J. H. McCarthy
HIS AGENT

United States Patent Office 2,811,209
Patented Oct. 29, 1957

2,811,209

WELL CLEAN-OUT METHOD

Randell L. Elkins, Odessa, Tex., assignor to Shell Development Company, New York, N. Y., a corporation of Delaware Application April 12, 1956, Serial No. 577,733

2 Claims. (Cl. 166—38)

This invention relates to the treatment of a porous formation traversed by a well to increase the flow of fluid to or from said formation, and pertains more particularly to a method for removing materials which have become deposited by filtering upon the face of the porous formation in a water injection well.

In many oil fields, two main types of wells are drilled: oil wells, from which formation fluids consisting of oil and/or gas and/or water are produced, and water wells, into which water may be injected for disposing of water previously produced from an oil well, or for the purpose of injecting water into an oil-producing formation in the secondary method of oil recovery by flooding.

In these well operations, the ease with which fluids may be injected into or produced from a porous formation is dependent upon, among other factors, whether or not any materials cling to, have been deposited or formed on, or have been filtered out on the wall of the well adjacent the porous formation. Any materials adhering to the face of the porous formation tend to block the interstices between the sand grains and thus reduce the flow of fluid to or from the porous formation.

Materials that tend to block the flow of fluid to or from a porous formation fall in two general classes. First, there are organic materials such as paraffin, asphalt, asphaltenes, etc., which tend to accumulate and form a sticky sheath on the wall of the well and which may generally be removed either by scraping, or washing with a solvent or liquid heated to a temperature higher than the melting point of the materials.

The second general type of plugging materials, with which this invention is directly concerned, comprises mostly inorganic materials such as sand, limestone, rust from the pipes and casing, and any other type of inorganic contaminating particles. In water disposal wells and in water injection wells in flooding operations, these particles filter out of the water being injected into the porous formation and tend to clog the face of the porous formation.

It is therefore a primary object of this invention to provide a method for removing minute solid particles from the surface of a porous formation in a well.

It has been found heretofore that at times the application of heat, a hot liquid, or a heat-generating substance often tends to fuse certain types of plugging materials on the face of the porous formation instead of melting said materials and allowing them to flow and be washed off the formation. This fused mass on the face of the formation forms a barrier that is more impervious to the desired flow than the original particles prior to treatment.

It is therefore another object of this invention to provide a method for removing clogging particles from a porous formation in a well, said removal of particles being carried out at a temperature substantially equal to that of the well temperature, thus preventing any possible fusing of the clogging materials on the face of the formation.

These and other objects of this invention will be understood from the following detailed description of the invention taken with regard to the drawing, which shows a vertical sectional view through a well provided with a normal well casing and tubing.

Referring to the drawing, a well 10 has an uncased portion passing through the porous formation 11. The rest of the well is provided with a casing 12 which is closed at the top by a normal wellhead assembly 13, provided with conduits 14 and 15 for either withdrawing or injecting a fluid into the well. A lubricator 16 is mounted on the top of the wellhead assembly 13 and provided with valves 17 and 18. If desired, any suitable wire line seal may be provided within the lubricator 16. In addition to a well casing 12, the well may be provided with a tubing string 19 which is suspended from the wellhead assembly 13. In the event that it is desired to close the annular space 20 between the tubing string 19 and the casing 12, a packer 21 is carried on the inner tubing string 19 near the lower end thereof and may be expanded against the walls of the well.

The present method of cleaning out a well may be practiced by introducing a mixture of pressure-generating materials into a closed well wherein the materials are converted into a gaseous form. The gas thus generated builds up a pressure that is partially injected or penetrates into the porous formation, and is then suddenly released by opening the well to atmospheric pressure.

The preferred manner of carrying out the present well treatment method is to introduce into the well, preferably adjacent the porous formation thereof, a mixture of materials including a solidified gas, for example, Dry Ice (solid carbon dioxide), which is admixed or added simultaneously with a quantity of calcium carbide. Upon introduction into the well, the solid carbon dioxide or Dry Ice reverts to its gaseous form, and the calcium cabide reacts with water in the well to yield acetylene gas.

Since the reaction between the calcium carbide and water is exothermic, considerable heat is generated. However, since the Dry Ice has a cooling effect, no local heating at high temperatures takes place, thus preventing any materials on the porous formation from being fused thereon. The Dry Ice and the calcium carbide are preferably added in sufficient proportions so that the cold Dry Ice substantially neutralizes the heat generated by the calcium carbide, thus permitting these materials to generate a gaseous pressure at the temperature of the well adjacent the porous formation being cleaned.

The exact quantity or the ratio of Dry Ice to be mixed with calcium carbide for each well treatment can preferably be calculated only after determining the temperature of the fluid in the well adjacent the porous formation to be cleaned. Since wells in different locations vary in temperature considerably, and since the porous formation to be treated in any one well may vary in depth location from 50 feet to 15,000 feet or more, with an accompanying change in temperature anywhere from 60° to 350° F., it may be seen that no specific amounts or ratios of Dry Ice and calcium carbide can be determined in advance for a well if the treatment is to be carried out at well temperature. Thus, 2.6 lbs. of Dry Ice were needed per pound of calcium carbide in one well treatment, 2.1 lbs. of Dry Ice in another treatment and 3.3 lbs. of Dry Ice in another treatment.

While the presence of the Dry Ice in the mixture of treating materials acts to neutralize a portion of the heat liberated by the reaction of the carbide, with water, the action of the calcium carbide is to prevent the temperature of the well fluid from being decreased excessively, thus removing any danger of freeze-up of well fluid, which could occur if Dry Ice was used alone as the gas generating material for well cleaning purposes.

The predetermined quantity of a mixture of Dry Ice and calcium carbide may be introduced into a well in any one of several ways. Referring to the drawing, with valve 17 closed at the top of the wellhead assembly, valve 18 at the top of the lubricator 16 may be opened and the charge of gas-generating clean-out material introduced into the lubricator, after which valve 18 is closed. Valve 17 is then opened and the gas-generating material consisting of the Dry Ice and calcium carbide is allowed to drop down into the tubing string 19. Immediately the Dry Ice begins to sublime to carbon dioxide gas and the calcium carbide reacts with any water in the tubing string or in the well to generate acetlyene gas. With the necessary valves in the wellhead assembly closed so that the well is shut in, the gas generated in the tubing or at the bottom of the well depresses the fluid level in the tubing string 19 and forces water or well fluid into the formation. At the same time some of the gas is absorbed in the water. The amount of Dry Ice and calcium carbide mixture to be added depends upon the fluid level depression desired, the internal tubing pressure and the amount of gas absorbed.

When the desired fluid level depression is obtained, an additional batch of Dry Ice and calcium carbide may be introduced into the well through the lubricator 16 in the same manner as the first batch, and sufficient time is allowed for this second batch of gas generating material to drop through the column of gas and water to the bottom of the well.

One of the valves in the wellhead assembly 13 is then opened so that the gas in the tubing string 19 is allowed to escape as rapidly as possible. As the gas escapes from the tubing string 19 the level of water rises therein and water which was forced into the porous formation 11 surges into the well bore 10 from the formation at a relatively high initial rate. This water surging from the formation into the well removes clogging materials from the face of the porous formation. At the same time the gas which is dissolved in the water tends to break out of solution and lighten the column of liquid in the tubing string 19. Additionally, the second batch of Dry Ice and calcium carbide injected into the well generates sufficient gas to lighten the fluid load so that the well tends to back flow and flush the material which was washed from the formation up the tubing string 19 where it may be discharged at the surface. The clogging material removed from the face of the formation may also be removed from the well by circulating fluid through conduit 15 down the annular space 20 when a packer 21 is not used in the well assembly and provided the formation pressure is higher than the circulation pressure. The fluid containing the clogging material can also be pumped or gas-lifted from the well.

Instead of merely dropping the gas generating materials down through the tubing string 19, they may be circulated into the tubing string by a fluid such as water introduced into the tubing string through the conduit 14. Additionally, it may be desirable at times to run the gas generating materials down to the bottom of the well in a suitable container, such for example as a wire-line dump bailer. In some well installations it may be found desirable to put the gas generating materials in a container made of a slowly water-soluble material so that the container would have sufficient time to drop through the tubing string 19 to the bottom of the well before starting to disintegrate.

Whatever method is employed in injecting the gas generating materials into the well, it is essential that the well be shut in while the gases are being generated in the well.

While, as previously described, the present method of injecting the gas generating materials into the well may call for two or more separate batches of the materials to be introduced, adequate results in cleaning of formations may often be obtained by the introduction of the materials in a single batch. The amounts of material to be used vary with every well cleaning job, depending upon the area to be cleaned, the depth of the well, the type of material clogging the porous formation, etc. As an example, cleaning out one 1800 foot water injection well in a water flood project, only 55 lbs. of calcium carbide and 143 lbs. of Dry Ice were needed. In addition to cleaning water-flood wells or water-disposal wells, the present method may be employed in cleaning the formation face in wells producing a mixture of oil and water or for restoring the natural flow to flowing wells producing both oil and water.

I claim as my invention:

1. A method for removing minute particles of clogging materials from the face of a porous formation traversed by a well, said method comprising the steps of introducing a mixture of at least two gas generating materials into said well, one of said materials generating gas by an exothermic process, the other of said materials generating gas by an endothermic process, said two materials being in a ratio so that the heat generated by the exothermic process is substantially neutralized by the heat absorbed by the endothermic reaction within the well at the level of the porous formation being cleaned, shutting in said well, allowing pressure to build up in said well whereby a portion of the fluid in the well is forced into said porous formation, opening said well and releasing the pressure therein whereby the fluid forced into the formation surges back into the well and removes the clogging materials from the face of the porous formation.

2. A method for removing minute particles of clogging materials from the face of a porous formation traversed by a well containing at least a small quantity of water, said method comprising the steps of introducing a mixture of calcium carbide and solid carbon dioxide into said well, said calcium carbide and solid carbon dioxide being in a ratio so that the heat generated by the calcium carbide reacting with water is substantially neutralized by the heat absorbed by the sublimation of the solid carbon dioxide within the well at the level of the porous formation being cleaned, shutting in said well, allowing pressure to build up in said well whereby a portion of the fluid in the well is forced into said porous formation, opening said well and releasing the pressure therein whereby the fluid forced into the formation surges back into the well and removes the clogging materials from the face of the porous formation.

References Cited in the file of this patent

UNITED STATES PATENTS

| | | |
|---|---|---|
| 1,806,499 | Ranney | May 19, 1931 |
| 2,207,184 | White | July 9, 1940 |
| 2,259,428 | Shelley | Oct. 14, 1941 |
| 2,748,867 | Lissant | June 5, 1956 |